(12) United States Patent
Lee et al.

(10) Patent No.: US 7,974,001 B2
(45) Date of Patent: Jul. 5, 2011

(54) DISPLAY ELEMENT AND ELECTRONIC PAPER

(75) Inventors: Sang Moon Lee, Seoul (KR); Yongsoo Oh, Seongnam (KR); Hwan-Soo Lee, Seoul (KR); Jeong Bok Kwak, Suwon (KR); Sung Eun Kim, Suwon (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 0 days.

(21) Appl. No.: 12/549,263

(22) Filed: Aug. 27, 2009

(65) Prior Publication Data

US 2010/0271687 A1    Oct. 28, 2010

(30) Foreign Application Priority Data

Apr. 28, 2009   (KR) .................. 10-2009-0037135

(51) Int. Cl.
*G02B 26/00* (2006.01)
*G09G 3/34* (2006.01)

(52) U.S. Cl. ...................... 359/296; 345/107

(58) Field of Classification Search .............. 359/296; 345/107; 430/32; 204/600
See application file for complete search history.

(56) References Cited

U.S. PATENT DOCUMENTS

| 5,389,945 | A | 2/1995 | Sheridon |
| 6,985,132 | B2 * | 1/2006 | Nomura et al. ............... 345/107 |
| 7,837,198 | B2 * | 11/2010 | Nishitsuji et al. ......... 273/143 R |

FOREIGN PATENT DOCUMENTS

| JP | 2005-250066 | 9/2005 |
| KR | 2003-0038789 | 5/2003 |
| WO | WO 02/29485 | 4/2002 |

* cited by examiner

*Primary Examiner* — William C Choi
(74) *Attorney, Agent, or Firm* — McDermott Will & Emery LLP

(57) ABSTRACT

There are provided a display element and electronic paper. The display element includes a structure having a cylindrical shape and including a void inside, and at least two display regions formed on a side face of the structure and colored with different colors. The use of the display element for electronic paper can improve a response rate while lowering driving voltage, and can improve a contrast ratio by increasing a packing fraction.

16 Claims, 5 Drawing Sheets

DISPLAY ELEMENT AND ELECTRONIC PAPER

CROSS-REFERENCE TO RELATED APPLICATIONS

This application claims the priority of Korean Patent Application No. 2009-37135 filed on Apr. 28, 2009, in the Korean Intellectual Property Office, the disclosure of which is incorporated herein by reference.

BACKGROUND OF THE INVENTION

1. Field of the Invention

The present invention relates to a display element and electronic paper using the same, and more particularly, to a display element capable of achieving low driving voltage, a high response rate and an improved contrast ratio, and electronic paper using the same.

2. Description of the Related Art

Display devices with superior portability are attracting much attention with the development of mobile information terminals or information communications networks. In particular, electronic paper is in the limelight among such display devices. The electronic paper utilizes a method of dispersing electrophoretic particles having a specific color between two transparent electrodes or disposing rotary balls having electrical or optical anisotropy therebetween.

As for the method of using rotary balls, the surface of each of the hemispherical structures known as twist balls is colored with two different colors, and the regions of the two different colors have different charges. When voltage is applied to two transparent electrodes, the twist balls rotate according to a voltage direction. Thus, a desired image can be displayed by properly controlling the voltage direction with respect to each of the twist balls.

SUMMARY OF THE INVENTION

An aspect of the present invention provides a display element capable of reducing a driving voltage and increasing a response rate and a contrast ratio when used for electronic paper.

According to an aspect of the present invention, there is provided a display element including: a structure having a cylindrical shape and including a void inside; and at least two display regions formed on a side face of the structure and colored with different colors.

The at least two display regions may include first and second display regions.

The first display region and the second display region may be charged with positive charges and negative charges, respectively.

The void of the structure may be closed from the outside by the structure.

The void of the structure may be filled with air. Alternatively, the void of the structure may be in a state of vacuum.

The void of the structure may be formed by removing a portion of the structure to penetrate the cylindrical shape in a height direction.

The display element may have a specific gravity of 1 or less by the void of the structure.

According to another aspect of the present invention, there is provided electronic paper including: upper and lower electrodes facing each other; a partition wall structure having a lattice shape and disposed between the upper and lower electrodes; and a display element disposed in a region surrounded by the partition wall structure, and including a structure having a cylindrical shape, and at least two display regions formed on a side face of the structure, colored with different colors and charged with positive charges and negative charges, respectively.

The display device may be disposed in each region surrounded by the partition wall structure.

An area of the region surrounded by the partition wall structure may be identical to an area occupied by the display element.

The partition wall structure may be formed by imprinting.

At least one of the upper and lower electrodes may transmit light.

The electronic paper may further include a transparent medium having an electrical insulating property and sealing the display element.

The structure may have a void inside.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
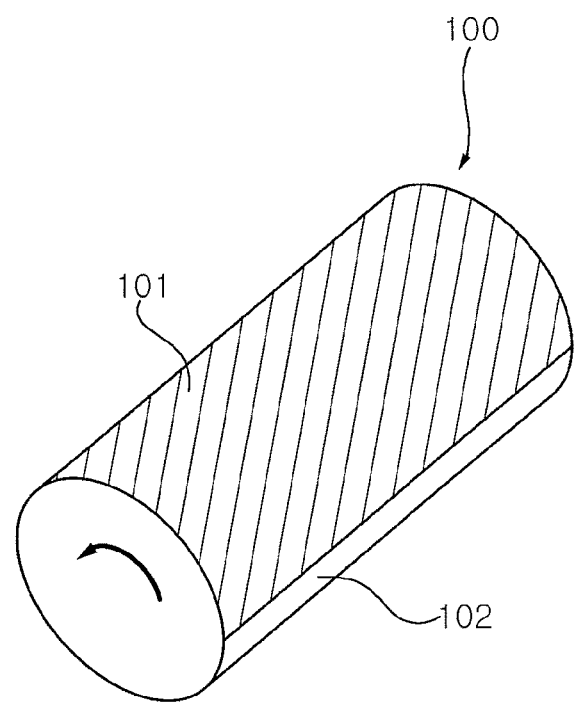
FIG. 1 is a perspective view illustrating a display element according to an exemplary embodiment of the present invention.

Exemplary embodiments of the present invention will now be described in detail with reference to the accompanying drawings. The invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and sizes of elements may be exaggerated for clarity. Like reference numerals in the drawings denote like elements.

Figure 2:
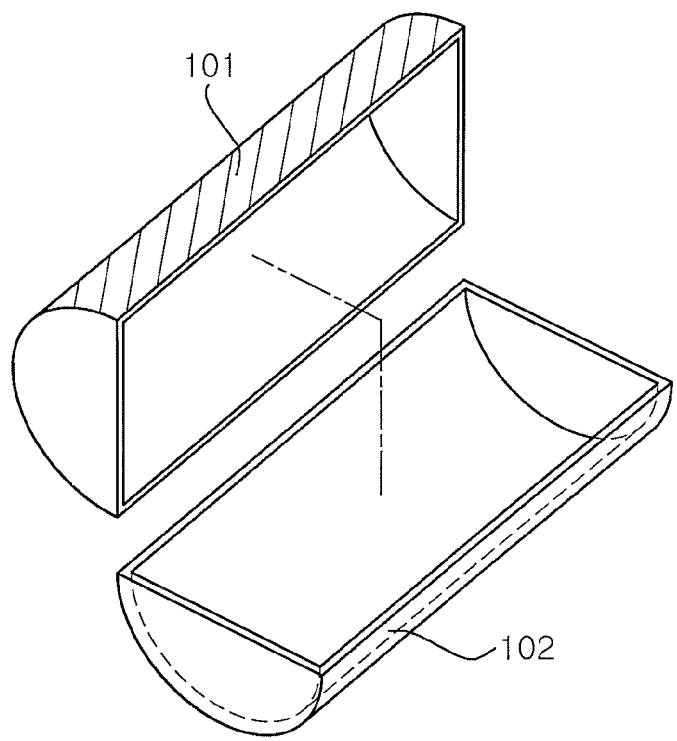
FIG. 2 is an exploded perspective view of the display element depicted in FIG. 1.

FIGS. 1 and 2 are a perspective view and an exploded perspective view illustrating a display element according to an exemplary embodiment of the present invention, respectively. As shown in FIGS. 1 and 2, a display element 100 according to this embodiment is a cylindrical structure having first and second display regions 101 and 102 on the surface thereof. The cylindrical structure has an empty region (hereinafter, referred to as a void) inside, that is, is hollow. According to the related art, a hemispherical structure called a twist ball is used as a display element. Unlike the related art, a cylindrical structure (hereinafter also referred to as a cylinder) is employed as a display element in this embodiment. Therefore, the display element 100, according to this embodiment, may be referred to as a twist rod in comparison with the related art.

Figure 7:
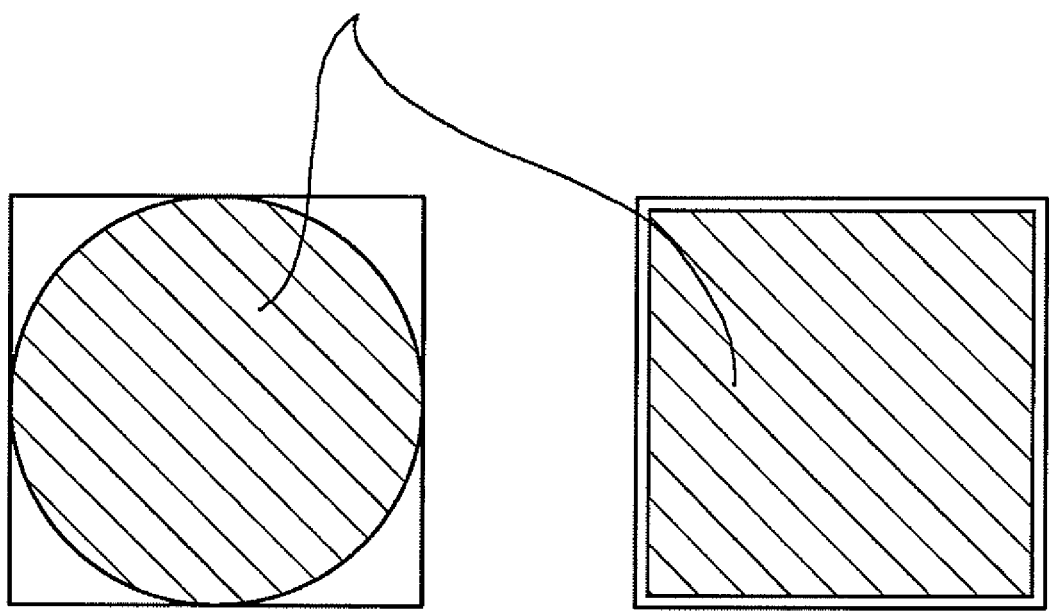
FIG. 7 illustrates a difference in packing fraction between a twist ball according to the related art (on the left side of the drawing) and a twist rod (on the right side of the drawing).

When viewed from the outside, the side face of the cylinder corresponds to a quadrangle such as a rectangle or a regular square. Accordingly, using the side face of the quadrangle as a display region may increase a packing fraction. Here, the packing fraction may be defined as a ratio of an area substantially occupied by a display element in an area corresponding to a single pixel. FIG. 7 illustrates a difference in packing fraction between a twist ball according to the related art (on the left side of the drawing) and a twist rod (on the right side of the drawing). For comparison, the side face of the cylinder is formed as a regular square unlike the shape depicted in FIG. 1. As shown in FIG. 7, the twist rod has a higher packing fraction than the twist ball. In detail, assuming that the area of the regular spare is 100%, the packing fraction of the twist ball reaches about 78.5%. Due to this increase in packing fraction, the use of the twist rod for a display device may contribute to increasing a contrast ratio.

The first and second display regions 101 and 102 are colored with different colors, for example, black and white, so that as the display element 100 rotates, different colors can be displayed when viewed from a specific location. In this embodiment, two display regions are formed on the surface of the display element 100. However, there may be three or more display regions as necessary. In addition, the display regions may be colored with various colors, not just black or white.

In order to rotate the display element 100 by voltage applied thereto, the first and second display regions 101 and 102 are charged to opposite polarities. That is, the first and second display regions 101 and 102 may be charged with positive charges and negative charges, respectively. In this case, a known method in the art may be used for processing the surface of the cylindrical structure electrically and optically to form the first and second display regions 101 and 102. For example, there may be used a method of applying a centrifugal force to a hollow cylindrical structure provided into a rotary disc including two coloring liquids.

The cylindrical structure forming the display element 100 may utilize an organic material or an inorganic material. The organic material may utilize polymethylmethacrylate (PMMA), a silicon resin or a urethane resin for example, and the inorganic material may utilize silica, alumina or glass for example. Among the above mentioned materials, a material that facilitates the formation of a void therein may be selected properly and used. As described above, the display element 100 has a hollow structure. The hollow structure means that the inside of the cylindrical structure is filled with air or in a state of vacuum. In this case, an empty part, that is, a void may have a volume ranging from 10% to 80% with respect to the entire volume.

According to this embodiment, by forming the inside of the display element 100 as a vacuum or an air void, the specific gravity of the display element 100 may be reduced significantly. A general twist ball, according to the related art, is a solid ball structure formed using zirconia or the like. In comparison, the display element 100 according to this embodiment may have reduced specific gravity of 1 or less by using another organic or inorganic material instead of zirconia and forming the inside as a vacuum or an air void. Accordingly, the magnitude of a driving voltage required for the rotation of the display element 100 can be lowered, and the response rate of the display element 100 can also be improved. A method of obtaining the hollow structure may be selected properly according to a material constituting the display element 100. For example, a foaming method, a sintering method, a stretching method, an extraction method, or a track etching method may be used.

Figure 3:
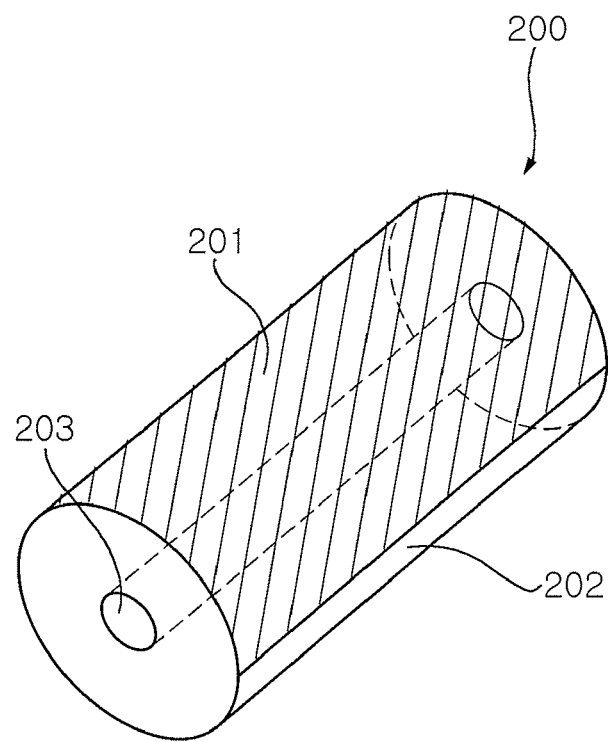
FIG. 3 is a perspective view illustrating a display element according to another exemplary embodiment of the present invention.

FIG. 3 is a perspective view illustrating a display element according to another exemplary embodiment of the present invention. As in the previous embodiment, a display element 200 according to this embodiment has a cylindrical structure (in the form of a cylinder) and includes first and second display regions 201 and 202 on its surface. According to this embodiment, the structure may have a hollow shape due to a through region 203 formed by removing a portion to penetrate the cylinder in a height direction. Since the through region 203 is formed by removing a portion of a solid cylinder, the structure according to this embodiment can be obtained relatively easily compared with the previous embodiment.

Figure 4:
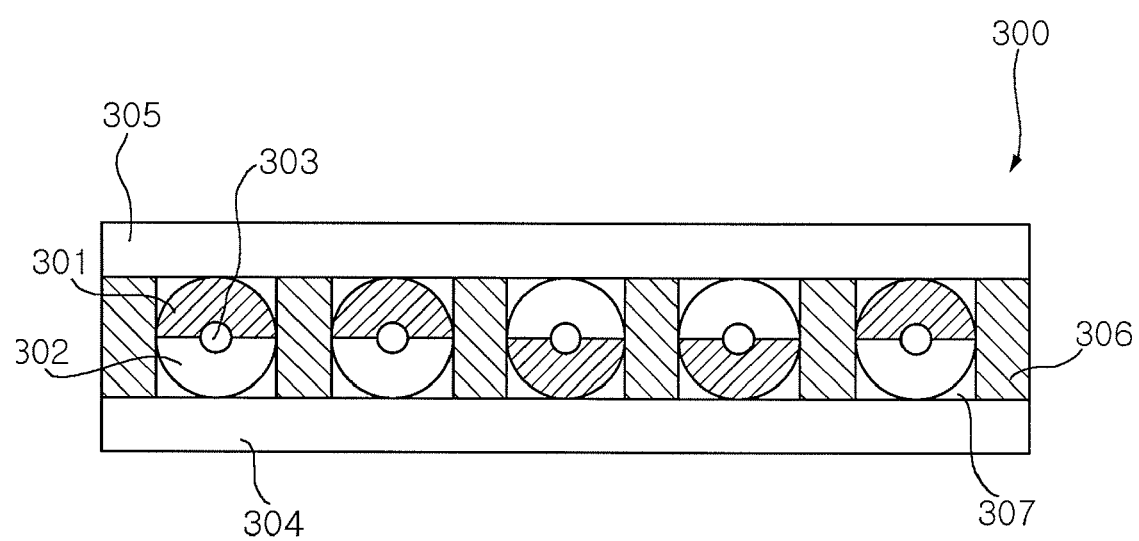
FIG. 4 is a schematic cross-section view illustrating electronic paper employing the display element depicted in FIG. 3, according to an exemplary embodiment of the present invention.
Figure 5:
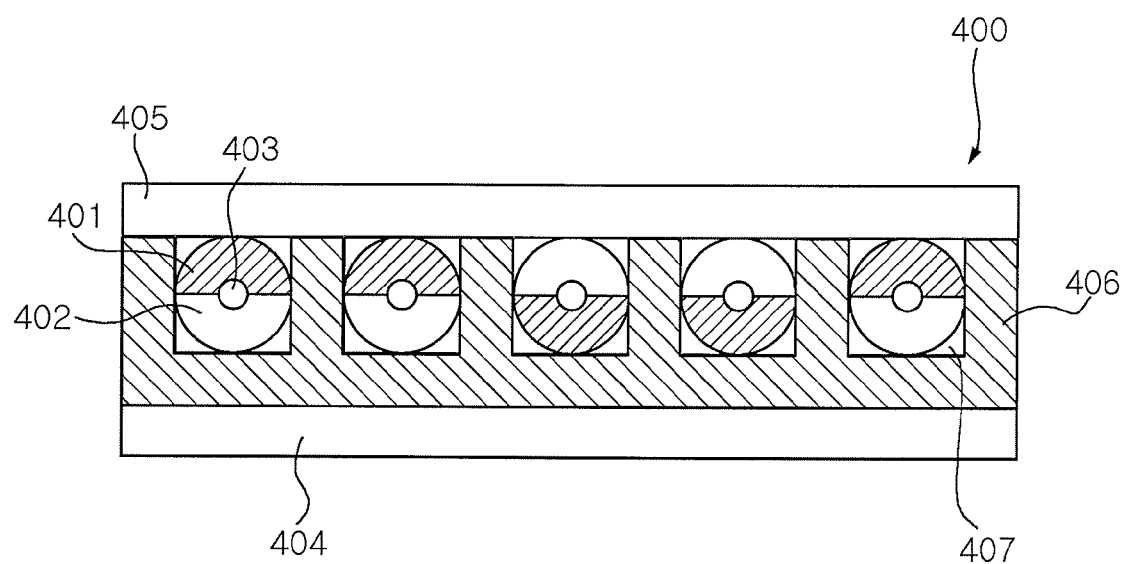
FIG. 5 is a schematic cross-section view illustrating electronic paper employing the display element depicted in FIG. 3, according to another exemplary embodiment of the present invention.
Figure 6:
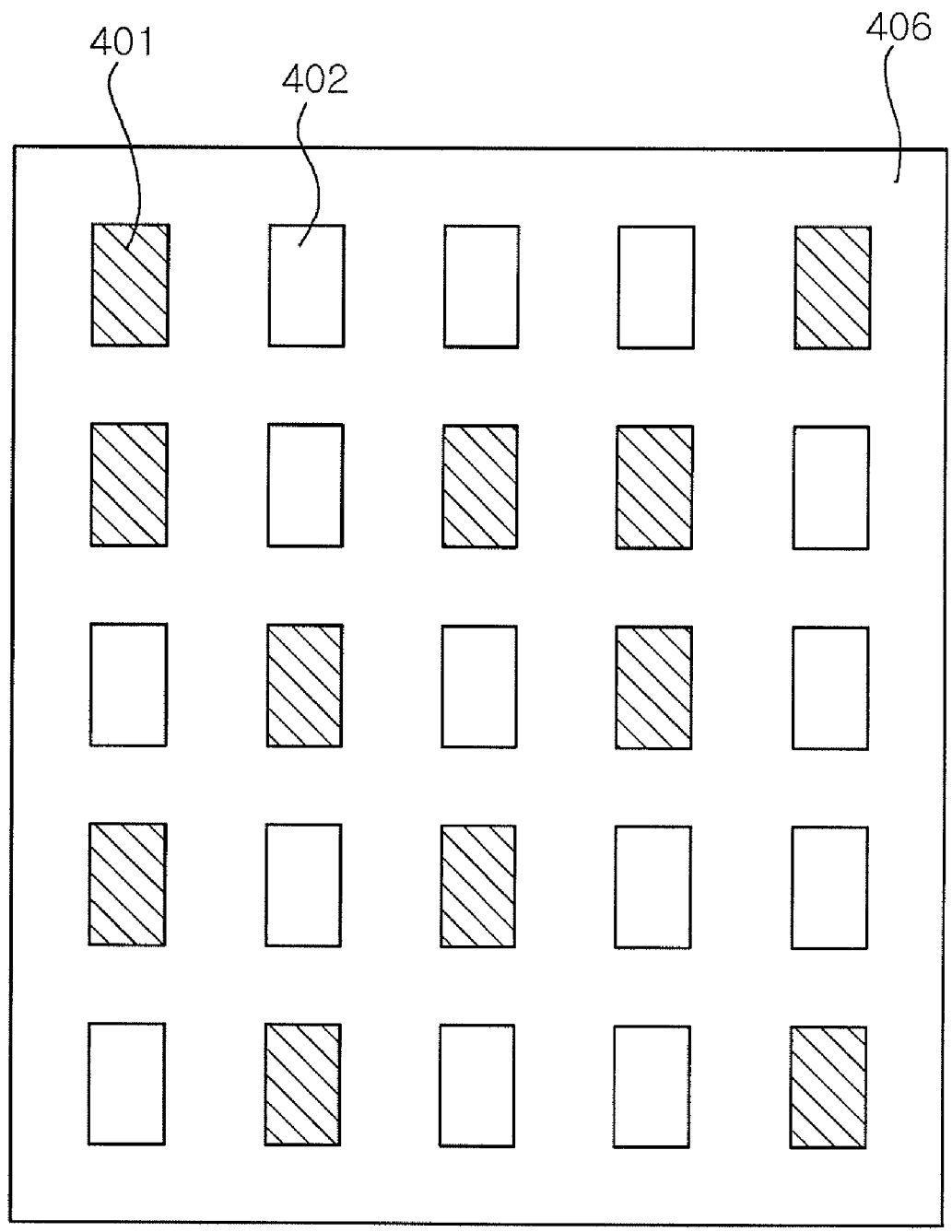
FIG. 6 is a top plan view illustrating a partition wall structure and a display element in the electronic paper depicted in FIG. 4.

FIG. 4 is a schematic cross-section view illustrating electronic paper employing the display element depicted in FIG. 3, according to an exemplary embodiment of the present invention. FIG. 5 is a schematic cross-section view illustrating electronic paper employing the display element depicted in FIG. 3, according to another exemplary embodiment of the present invention. FIG. 6 is a top plan view illustrating a partition wall structure and a display element in the electronic paper depicted in FIG. 4. Referring to FIG. 4, electronic paper 300 includes twist rods (i.e., display devices) each having first and second display regions 301 and 302 and a through region 303, a lower electrode 304, an upper electrode 305, a partition wall structure 306, and a transparent medium 307. As described above, the display element has a cylindrical structure with a void therein and thus has a considerably low specific gravity, thereby contributing to lowering driving voltage. Also, the display element has a high packing fraction, thereby achieving a high contrast ratio. In this case, as shown in FIGS. 4 and 6, one display element is disposed in each region surrounded by the partition wall structure 306. In this case, the contrast ratio may be further improved by rendering an area occupied by the display element substantially identical to an area surrounded by the partition wall structure 306.

Upper and lower electrodes 305 and 304 are formed of a transparent conductive material, for example, indium tin oxide, and they serve to apply voltage to the display element. In this case, although not shown, a control unit may be provided in order to control the magnitude and direction of voltage being applied to each of the display elements, separately. The partition wall structure 306 is disposed between the upper and lower electrodes 305 and 304, and accommodates display elements separately in pixel units. For structural stability, the height of the partition wall structure 306 may be greater than the diameters of the upper and lower surfaces of the display element. The transparent medium 307 has an electrical insulating property and seals the display element to facilitate the rotation of the display element.

In the case of the embodiment depicted in FIG. 5, electronic paper 400, as in the embodiment depicted in FIG. 4, includes display elements configured in the form of twist rods each having first and second display regions 401 and 402 and a through region 403, a lower electrode 404, an upper electrode 405, a partition wall structure 406 and a transparent medium 407. The difference from the embodiment depicted in FIG. 4 is the partition wall structure 406. In the case of this embodiment, the partition wall structure 406 may be formed by a Roll-to-Roll (R2R) imprinting method. By forming the partition wall structure 406 using the imprinting method, a manufacturing process can be simplified and facilitated. This is because the upper electrode 405 and the lower electrode 404 are bonded to the partition wall structure 406 by using the R2R process.

As set forth above, according to exemplary embodiments of the invention, a response rate can be improved while driving voltage is lowered by using the twist rods for electronic paper.

While the present invention has been shown and described in connection with the exemplary embodiments, it will be apparent to those skilled in the art that modifications and variations can be made without departing from the spirit and scope of the invention as defined by the appended claims.

What is claimed is:

1. A display element comprising:
   a structure having a cylindrical shape and including a void inside; and
   at least two display regions formed on a side face of the structure and colored with different colors,
   wherein the at least two display regions comprise first and second display regions, and the first display region and the second display region are charged with positive charges and negative charges, respectively.

2. The display element of claim 1, wherein the void of the structure is formed by removing a portion of the structure to penetrate the cylindrical shape in a height direction.

3. A display element comprising:
   a structure having a cylindrical shape and including a void inside; and
   at least two display regions formed on a side face of the structure and colored with different colors,
   wherein the void of the structure is closed from the outside by the structure.

4. The display element of claim 3, wherein the void of the structure is filled with air.

5. The display element of claim 3, wherein the void of the structure is in a state of vacuum.

6. A display element comprising:
   a structure having a cylindrical shape and including a void inside; and
   at least two display regions formed on a side face of the structure and colored with different colors,
   wherein the display element has a specific gravity of 1 or less by the void of the structure.

7. Electronic paper comprising:
   upper and lower electrodes facing each other;
   a partition wall structure having a lattice shape and disposed between the upper and lower electrodes; and
   a display element disposed in a region surrounded by the partition wall structure, the display element comprising:
      a display element structure having a cylindrical shape including a void inside; and
      at least two display regions formed on a side face of the structure, colored with different colors and charged with positive charges and negative charges, respectively.

8. The electronic paper of claim 7, wherein the display device is disposed in each region surrounded by the partition wall structure.

9. The electronic paper of claim 8, wherein an area of the region surrounded by the partition wall structure is identical to an area occupied by the display element.

10. The electronic paper of claim 7, wherein the partition wall structure is formed by imprinting.

11. The electronic paper of claim 7, wherein at least one of the upper and lower electrodes transmits light.

12. The electronic paper of claim 7, further comprising a transparent medium having an electrical insulating property and sealing the display element.

13. The electronic paper of claim 7, wherein the void of the display element structure is closed by the structure.

14. The electronic paper of claim 13, wherein the void of the display element structure is filled with air.

15. The electronic paper of claim 7, wherein the void of the display element structure is in a state of vacuum.

16. The electronic paper of claim 7, wherein the void of the display element structure is formed by removing a portion of the structure to penetrate the cylindrical shape in a height direction.

* * * * *